United States Patent
Patwardhan

(10) Patent No.: US 10,204,016 B1
(45) Date of Patent: Feb. 12, 2019

(54) INCREMENTALLY BACKING UP FILE SYSTEM HARD LINKS BASED ON CHANGE LOGS

(71) Applicant: EMC Corporation, Hopkinton, MA (US)

(72) Inventor: Kedar S. Patwardhan, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 343 days.

(21) Appl. No.: 14/326,082

(22) Filed: Jul. 8, 2014

(51) Int. Cl.
*G06F 11/14* (2006.01)

(52) U.S. Cl.
CPC .................. *G06F 11/1458* (2013.01)

(58) Field of Classification Search
CPC .................................. G06F 11/1458
USPC ........................................ 707/646
See application file for complete search history.

(56) References Cited

U.S. PATENT DOCUMENTS

| | | | | |
|---|---|---|---|---|
| 6,192,375 B1* | 2/2001 | Gross | ............... | G06F 17/30067 |
| 7,599,971 B1* | 10/2009 | Hagerstrom | ...... | G06F 17/30221 |
| 8,055,613 B1* | 11/2011 | Mu | ...................... | G06F 11/1451 |
| | | | | 707/610 |
| 9,229,942 B1* | 1/2016 | MacNeill | ............ | G06F 11/1458 |
| 2008/0222152 A1* | 9/2008 | Godbole | ........... | G06F 17/30067 |
| 2015/0269214 A1* | 9/2015 | Avati | ................ | G06F 17/30368 |
| | | | | 707/689 |

\* cited by examiner

*Primary Examiner* — Hicham Skhoun
(74) *Attorney, Agent, or Firm* — Dergosits & Noah LLP; Todd A. Noah

(57) ABSTRACT

Incrementally backing up file system hard links based on change logs is described. A system identifies a unique identifier and a file name associated with a file event in a file system. The system determines whether a change log for the file system lacks an association between the unique identifier and the file name. The system adds the file name to one of a new file name list and a deleted file name list associated with the change log in response to a determination that the change log for the file system lacks the association between the unique identifier and the file name. The system incrementally backs up the file event based on at least one of the new file name list and the deleted file name list.

14 Claims, 4 Drawing Sheets

INCREMENTALLY BACKING UP FILE SYSTEM HARD LINKS BASED ON CHANGE LOGS

BACKGROUND

If a software error corrupts data, or if erroneous data updates the data, a data protection administrator may restore the data to a previous uncorrupted state that does not include the corrupted or updated erroneous data. A backup application executes a backup operation either occasionally or continuously to enable this restoration, storing a copy of each desired data state (such as the values of data and these values' embedding in a database's data structures) within dedicated backup files. If the data protection administrator decides to return the data to a previous state, the data protection administrator specifies the desired previous state by identifying a desired point in time when the data was in this state, and instructs the backup application to execute a restore operation to restore a copy of the corresponding backup files for that state to the data.

Performing a full backup of data can consume significant resources, especially when the backups are retained over time. Incremental backups reduce the amount of data backed up because an incremental backup only backs up changes that have been made to the data since the last backup. Identifying which data files, or data objects, have changed since the last backup may require a backup application or its agent to examine all of the data files and to analyze their change time stamps. However, larger file systems may have millions of data files, such that this examination and analysis can become a time consuming process and can degrade the file system's computing performance. Some backup applications trawl an entire file system to generate a list of changes files for incremental backups, but this trawling can consume significant resources. Other backup applications may take advantage of a file system's native change log as an alternative to trawling an entire file system.

DETAILED DESCRIPTION

Figure 1:
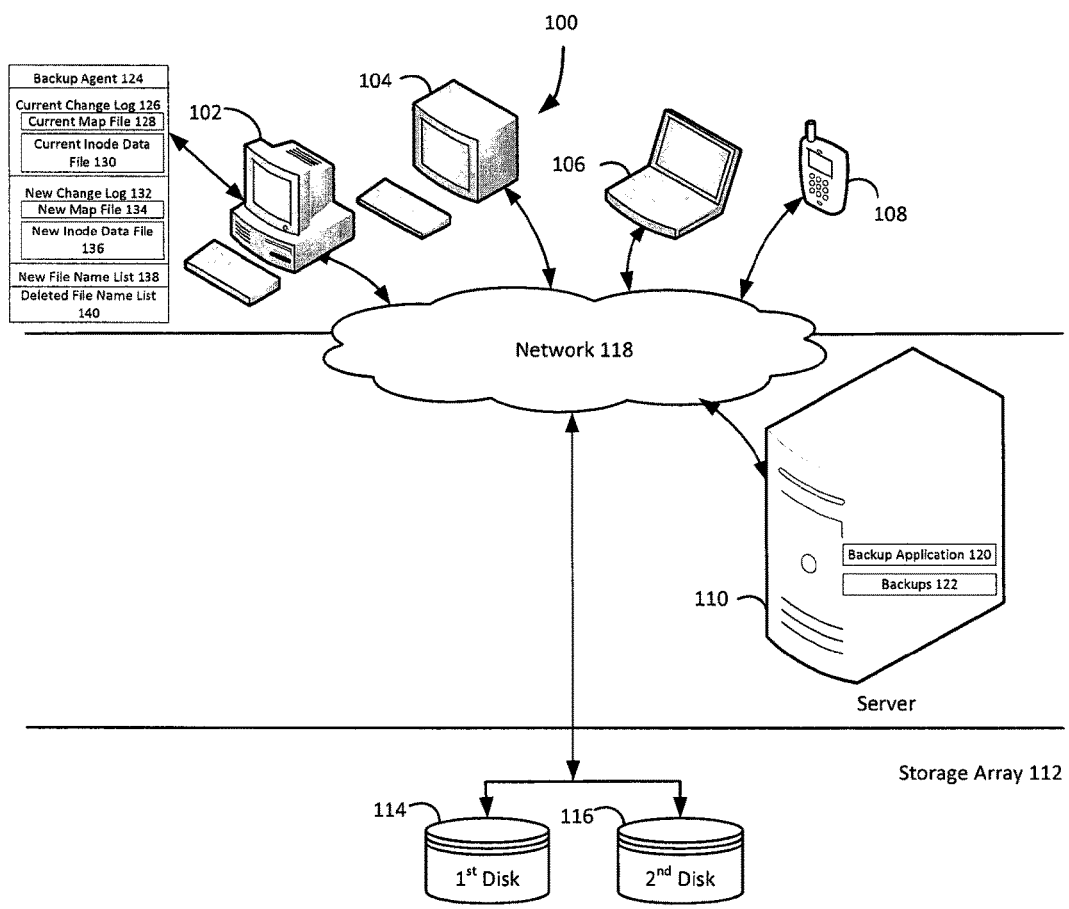
FIG. 1 illustrates a block diagram of an example system for incrementally backing up file system hard links based on change logs, under an embodiment.

Using a native change log for incremental backups can also result in degraded performance because a conventional change log temporally records every change that occurs to files in different change log records. For example, a change log records that a particular file is created in a first change log record, then records a large number of changes to the particular file in multiple change log records, and finally records that the particular file is deleted in a final change log record. Since a change log records changes for all files, the change log records for the particular file are interspersed with change log records for other files. During a backup of the file system, a backup application or its agent needs to process all of these change log records for the particular file even though this particular file is ultimately deleted. Consequently, the backup application or its agent identifies the particular file that was created and subsequently deleted when processing the change log record to create the particular file, resulting in an unnecessary disk access in an attempt to back up the particular file, because the backup application or its agent is not yet aware of the later change log record to delete the file. Unnecessary disk accesses may degrade the performance of the backup application, its agent, and/or the physical file system.

Since change logs store file change records in a temporal order, the file system needs to purge the change log at regular intervals or wrap the change log to ensure that the change log's size does not become too large. If a backup application does not process a change log before the change log is purged or wrapped around due to size constraints, the backup application needs to perform a full backup to ensure backup integrity, which may adversely affect the backup frequency because a file system with a high change rate may require full backups at frequent intervals due to concerns with the change log's size, thereby wasting resources.

U.S. application Ser. No. 14/042,304 filed Sep. 30, 2013, entitled "A Summary File Change Log for Faster Forever Incremental Backup", which is hereby incorporated herein by reference, teaches a change log that uses unique identifiers that corresponds to each file, such as a file's corresponding index node number, to index a change log record for each changed file. Each file in a file system may be associated with a corresponding index node, or inode, which is a data structure that stores information about its corresponding file, such as file ownership, access mode, file type, size of the file, size of file at last backup, physical location, and timestamps, and is typically identified by a corresponding integer number. Every change to a particular file is stored in a single change log record for the particular file, which is indexed by the particular file's corresponding inode number. Therefore, a backup application or its agent can use a particular file's corresponding inode number to identify a complete set of changes to a particular file using a change log. For example, if a particular file was created, modified, and then removed, a backup agent uses the file system's inode numbers to discover all of this information in the change log in the same change log record, even though these events occurred at different times. Consequently, the backup agent does not need to generate an unnecessary disk access for the particular file that no longer exists. Additionally, the number of files that can be stored in a given file system depends on the number of defined inode. Therefore, the change log has a bounded size which is determined by the total number of inode in the file system. Consequently, the change log is proportional to the size of the file system and not proportional to the logical space of all of the large files present in the file system, such that the limited size change log does not need to be purged as regularly and does not need to wrap around.

A file backup system that uses a change log to quickly identify all changed files in a file system needs a way to track hardlinks of a file system. A hard link is a directory entry that associates a name with a particular file in a file system. All hardlinks for a particular file refer to the same file and may be represented by the same inode number. All changes to a particular file using one of its hardlinks are present when the particular file is accessed using any of its other hardlinks. A change log needs to store and retrieve hardlinks for each file so that each file is backed up only once. Hard links need special representation in a change log so that hard link create, remove, and rename operations to files can be correctly obtained from the change log at the time for a backup of the file system.

Embodiments herein incrementally back up file system hard links based on change logs. A unique identifier and a file name associated with a file event in a file system are identified. A determination is made whether a change log for the file system lacks an association between the unique identifier and the file name. The file name is added to a new file name list or a deleted file name list associated with the change log in response to a determination that the change log for the file system lacks the association between the unique identifier and the file name. The file event is incrementally backed up based on the new file name list and/or the deleted file name list. For example, a backup agent identifies an inode number 701 and a hardlink name associated with a file creation in a file system. The backup agent determines whether a change log for the file system lists the hardlink name as a name for the inode number 701. The backup agent adds the hardlink name to a new file name list pointed to by a change log record for the inode number 701 because the change log does not list the hardlink name as a name for the inode number 701. A backup application incrementally backs up the file creation based on the hardlink name as a new file name for the inode number 701. The backup agent stores hardlink names of files efficiently for the change logs that store file events which are indexed based on the inode numbers of changed files.

FIG. 1 illustrates a block diagram of a system that implements incrementally backing up file system hard links based on change logs, under an embodiment. As shown in FIG. 1, system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106, a fourth client 108; and a server 110 and a storage array 112 that may be provided by a hosting company. The clients 102-108 may be referred to as the desktop computer 102, the terminal 104, the laptop computer 106, and the mobile phone 108. The storage array 112 includes a first disk 114 and a second disk 116.

The clients 102-108, the server 110, and the storage array 112 communicate via a network 118. Although FIG. 1 depicts the system 100 with four clients 102-108, one server 110, one storage array 112, two disks 114-116, and one network 118, the system 100 may include any number of clients 102-108, any number of servers 110, any number of storage arrays 112, any number of disks 114-116, and any number of networks 118. The clients 102-108 and the server 110 may each be substantially similar to the hardware device 500 described below in reference to FIG. 5.

The server 110 includes a backup application 120 and backups 122. FIG. 1 depicts the system elements 120-122 residing completely on the server 110, but the system elements 120-122 may reside completely on the clients 102-108, completely on another server that is not depicted in FIG. 1, or in any combination of partially on the server 110, partially on the clients 102-108, and partially on the other server. The first client 102 includes a backup agent 124, a current change log 126, which includes a current map file 128 and a current inode data file 130, a new change log 132, which includes a new map file 134 and a new inode data file 136, a new file name list 138, and a deleted file name list 140. The new file name list 138 and the deleted file name list 140 may be linked file name lists, and may be combined together into a combined linked file name list which lists new file names at one end of the combined linked file name list and lists deleted file names at the other end of the combined linked file name list. FIG. 1 depicts the system elements 124-140 residing completely on the first client 102, but the system elements 124-140 may reside completely on any or all of the clients 102-108, completely on the server 110, completely on another server that is not depicted in FIG. 1, or in any combination of partially on the clients 102-108, partially on the server 110, and partially on the other server.

The backup application 120 may be, for example, EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup application, one of skill in the art would recognize that other backup applications and their corresponding functionalities may be used.

Although the following specifically describes the first client 102, the description applies equally to all of the clients 102-108. Data for the first client 102 is stored on the storage array 112 and/or on the first client 102. The backup agent 124 cooperates with the backup application 120 on the backup server 110 such that the data is backed up and that backups of the data are stored in the backups 122, which may include full and/or incremental backups of the data for the first client 102. The backup application 120 may provide the backup agent 124 to the first client 102, and the backup agent 124 may modify or replace the native change log in the first client 102 to create the system elements 126-140.

The backup agent 124 prepares for a subsequent backup operation after a current backup operation has concluded. The backup agent 124 manages the current change log 126 as the backup agent 124 continually detects file events. Detecting file events may rely on notifications from a layered file system positioned above a physical file system, such that all file events pass through or are detected by the layered file system and can be reported and processed. The current change log 126 may be a sparse file and may be formatted such that the size of the current change log 126 is bounded by associating the current change log 126 with inode. As a result, the size of the current change log 126 is bounded by number of inode in a given file system or by the potential number of inode in use. Since the size of the current change log 126 is limited to the largest inode number present in the file system, and since file systems reuse inode numbers, the size of the current change log 126 is thus limited. Therefore, the current map file 128 and the current inode data file 130 in the current change log 126 may be instantiated as sparse files that do not need to be purged as regularly and that do not need to wrap around.

The current map file 128 is a bitmap file that identifies the corresponding inode number for each file that was modified in the file system since the last backup of the file system. For example, after the data file that corresponds to the inode number 701 is modified, then the current map file 128 contains a "1" for the $701^{st}$ bit in the current map file 128. The current inode data file 130 identifies the actual changes that happen to each data file in the file system and corresponding metadata. For example, the current inode data file 130 may store a new file name pointer, a deleted file name pointer, the corresponding inode number (which can be used to index the inode-records), file size, or the like or combination thereof in a record for a given data file. A data file may be associated with a record in the current inode data file 130, which may also be accessed according to the data file's corresponding inode number.

The file event (file removal, deletion, or modification) is reflected in the corresponding file name linked list for the corresponding record of the current inode data file 130. If a data file in the file system is removed, a bit corresponding to the data file's inode number is set in the current map file 128, and the corresponding file name linked list in the corresponding record in the current inode data file 130 points to the full file name in an deleted file name linked list to indicate the name of the file that was removed. If a file is created in the file system, then a bit corresponding to the data file's inode number is set in the current map file 128, and the current inode data file 130 points to the full file name in a new file name linked list to indicate the name of the file that was created. If a file is modified in the file system, then a bit corresponding to the data file's inode number is set in the current map file 128, and the corresponding record in the current inode data file 130 points to a flag or other metadata indicating that the file was modified along with the data file name. All of these examples can be accomplished by ensuring that the records which are stored in the current inode data file 130 are indexed by their corresponding inode number.

The current change log 126 maintains all modifications to any data file at one corresponding location in the current inode data file 130. This enables the backup agent 124 to read one record in the current inode data file 130 to know everything about a data file. For example, if a data file was created, modified, and then removed since a most recent backup, the backup agent 124 finds the corresponding bit set for the data file's corresponding inode number in the current map file 128, and uses the data file's corresponding inode number to index into the current inode data file 130 and read the corresponding record, which points to information indicating that the data file was created, modified and removed. When the backup agent 124 processes the corresponding-record in the current inode data file 130, the backup agent 124 can determine from the corresponding record that the file no longer exists and the backup agent 124 no longer issues a disk access request for a file that has been removed.

A backup operation can be initiated automatically by the backup agent 124, the backup server 110, the backup application 120, by a user, or the like. When performing an incremental backup, the backup operation may be initiated according to a predetermined schedule. The backup agent 124 accesses the current map file 128 to generate a list of files, or portions thereof, which may need to be included in the current backup. The current map file 128 includes a bit for every file and its corresponding inode number in the file system and those inodes whose corresponding bits are set are evaluated for being backed up in the current backup operation. While the current map file 128 identifies the specific files that have been modified since the last backup of the file system, the current inode data file 130 points to information about the events that occurred with the file and enable the backup agent 124 to determine whether the file should be backed up. The current map file 128 also serves as an index to the current inode data file 130 that is used during the backup operation. Then the backup agent 124 processes the current inode data file 130 for each file in the list to determine whether to back up a file, as the file may have been removed and there is no longer a need to back up the file in the current backup. Each record in the current inode data file 130 presents the complete history of events that have occurred since the last backup for a corresponding file, such that each record enables the corresponding file to be handled appropriately.

Each record in the current inode data file 130 includes two pointers, as described below in reference to FIG. 3, a new file name pointer which points to a linked list where new file names of the corresponding file are stored, and a deleted file pointer which points to a linked list where deleted file names of the corresponding file are stored. If a hardlink for a corresponding file is renamed from an old file name to a new file name, the backup agent 124 may enter the new file name in the new file names linked list and enter the old file name in the deleted file names linked list. In the following examples, a particular file which corresponds to the inode number 701 begins the current backup cycle with two names, file1 and oldhardlink1.

The backup agent 124 identifies a unique identifier and a file name associated with a file event in a file system. For example, the backup agent 124 identifies the inode number 701 and a hardlink2 name associated with a file creation in a file system. In another example, the backup agent 124 identifies the inode number 701 and a newhardlink1 name associated with a file modification in a file system. In yet another example, the backup agent 124 identifies the inode number 701 and a file1 name associated with a file deletion in a file system.

Having identified a unique identifier and a file name, the backup agent 124 determines whether a change log for the file system lacks an association between the unique identifier and the file name. For example, the backup agent 124 determines whether the current change log 126 lists the hardlink2 name as a name for the inode number 701. In another example, the backup agent 124 determines whether the current change log 126 lists the newhardlink1 name as a name for the inode number 701. In yet another example, the backup agent 124 determines whether the current change log 126 lists the fuel name as a name for the inode number 701.

When the backup agent 124 is updating a change log for a particular file and determines that the corresponding inode identified by a name in the updated information already has an inode record with a different name, the backup agent 124 concludes that the particular file, or inode number, has hardlinks. If the change log lacks the association between the unique identifier and the file name, the backup agent 124 adds the file name to a new file name list or a deleted file name list associated with the change log. For example, the backup agent 124 adds the hardlink2 name to a new file name linked list pointed to by the current change log 126 because the current change log 126 does not list the hardlink2 name as a name for the inode number 701. If the new file name pointer is null, the backup agent 124 enters the hardlink2 name as the first entry in the new file name linked list, the new file name pointer points to the hardlink2 name in the new file name linked list, and the backup agent 124 enters "create" in the event mask for the first entry. If the new file name pointer points to an entry in the new file name linked list, the backup agent 124 enters the hardlink2 name as the next entry in the new file name linked list, the new file name pointer points to the hardlink2 name in the new file name linked list, and the backup agent 124 enters "create" in the event mask for the next entry.

In another example, the backup agent 124 adds the newhardlink1 name to a new file name linked list pointed to by the current change log 126 because the current change log 126 does not list the newhardlink1 name as a name for the inode number 701. If the new file name pointer is null, the backup agent 124 enters the newhardlink1 name as the first entry in the new file name linked list, the new file name pointer points to the newhardlink1 name in the new file name linked list, and the backup agent 124 enters "modify" in the event mask for the first entry. If the new file name pointer points to an entry in the new file name linked list, the backup agent 124 enters the newhardlink1 name as the next entry in the new file name linked list, the new file name pointer points to the newhardlink1 name in the new file name linked list, and the backup agent 124 enters "modify" in the event mask for the next entry. The backup agent 124 enters a new hard link name only once, regardless of how many times the new hard link name is used to modify a particular file. If an old hard link name is renamed as a new hard link name, the backup agent 124 determines whether the new file name linked list includes the old hard link name and whether the event mask for the old hard link name specifies "create." If the new file name linked list includes the old hard link name and the event mask for the old hard link name specifies "create," the backup agent 124 removes the old hard link name from the new file name linked list without adding the old hard link name to the deleted file name linked list because the old hard link name was created during the current backup cycle, such that no backup is needed of a hard link name that existed only temporarily. Instead, the backup agent 124 adds the new hard link name to the new file name linked list pointed to by the current change log 126 and enters "create" in the corresponding event mask.

In yet another example, the backup agent 124 adds the file1 name to a deleted file name linked list pointed to by the current change log 126 because the current change log 126 does not list the file1 name as a name for the inode number 701. If the deleted file name pointer is null, the backup agent 124 enters the file1 name as the first entry in the deleted file name linked list, the new file name pointer points to the file1 name in the deleted file name linked list, and the backup agent 124 enters "delete" in the event mask for the first entry. If the new file name pointer points to an entry in the deleted file name linked list, the backup agent 124 enters the file1 name as the next entry in the deleted file name linked list, the deleted file name pointer points to the fuel name in the deleted file name linked list, and the backup agent 124 enters "delete" in the event mask for the next entry.

If a change log record for an inode number already points to a new hard link name that is subsequently removed, the backup agent 124 determines whether the event mask for the new hard link names specifies that the hardlink name was created or modified. If the event mask specifies "create," and the change log does not lack the association between the unique identifier and the file name, the backup agent 124 optionally removes the file name from the new file name list associated with the change log. For example, the backup agent 124 removes the hardlink2 name from the new file name list pointed to by the current change log 126 because the current change log 126 should no longer list the hardlink2 name as a name for the inode number 701. If the event mask for a new hard link name specifies "create," the backup agent 124 removes the name from the new file name list without adding the new hard link name to the deleted file name list because both the hardlink create and the hardlink delete occurred during the same backup cycle, such that nothing needs to be backed up for a new hard link name that existed only temporarily.

If the event mask specifies "modify," and the change log does not lack the association between the unique identifier and the file name, the backup agent 124 optionally adds the file name to the deleted file name linked list associated with the change log. For example, the backup agent 124 adds the file1name to the deleted file name linked list pointed to by the current change log 126. If the event mask for a new hard link name specifies "modify," the backup agent 124 removes the new hard link name from the new file name linked list and adds the new hard link name to the deleted file name linked list because the new hard link name had already been created prior to the current backup cycle before it was modified during the current backup cycle, such that the hard link delete needs to be backed up for the hard link name.

After modifying the file name lists, the backup agent 124 incrementally backs up the file event based on the new file name list and/or the deleted file name list. For example, the backup application 120 incrementally backs up the file creation based on the hardlink1 name as a new file name for the inode number 701. In another example, the backup application 120 incrementally backs up the file modification based on the hardlink2 name as a new file name for the inode number 701. In yet another example, the backup application 120 incrementally backs up the file name deletion based on the file1 name as a deleted file name for the inode number 701. The backup agent 124 stores hard link names of files efficiently for the change logs 126-132 that store file events which are indexed based on the inode numbers of changed files.

Figure 2:
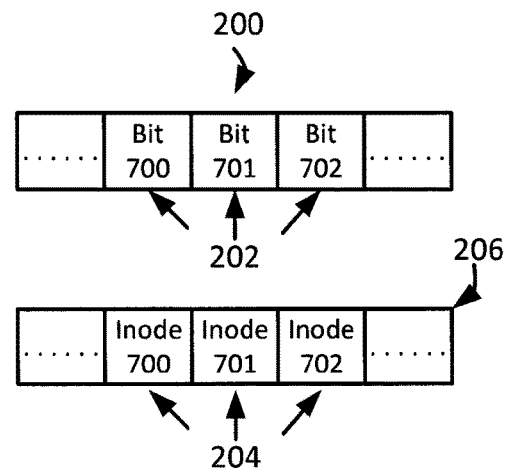
FIG. 2 is an extremely simplified example of a bit map for incrementally backing up file system hard links based on change logs, under an embodiment.

FIG. 2 illustrates an example of the current map file 128 that is included in the current change log 126 in FIG. 1. FIG. 2 illustrates an inode-bitmap file 200, which includes multiple bits that can be set to 0 or 1. Each of the bits 202 in the inode-bitmap file 200 corresponds to corresponding inode numbers 204 in an inode number list 206. Although FIG. 2 depicts a single bit per inode number, there may be multiple bits that correspond to each inode number. A corresponding bit may be set when an event occurs with respect to a data file based on the data file's corresponding inode number, such that each entry in the inode-bitmap file 200 that is set reflects a file event, such as create, modify, remove, set attribute, etc., that occurred since the last backup. The inode-bitmap file 200 requires minimal space to reference each inode number in a file system because the inode-bitmap file 200 requires only a single bit for each corresponding inode number, making storage of and reference to the inode-bitmap file 200 quick and efficient.

The details of the file event that corresponds to a bit set in the inode-bitmap file 200 may be found in the current inode data file 130. However, it may not be necessary to record every event in the current inode data file 130. For example, writes to a newly created data file could be omitted since the data file's status as newly created will cause the data file to be included in the next backup. By accessing the current inode data file 130 using the inode-bitmap file 200, the backup agent 124 can quickly and efficiently identify which files in the file system have been changed and might need to be backed up.

The inode-bit map 200 can be purged and all bits reset after an incremental backup. Alternatively, a separate inode-bitmap could be used for the next backup, such as the new map file 134 in the new change log 132. Thus, when a backup is initiated, the system 100 may switch to another inode-bitmap file, such as the new map file 134. However, the current inode data file 130 does not need to be purged as frequently because all changes since the most recent backup can be identified using the inode-bitmap file 200. Alternatively, when a backup is initiated, the system 100 may switch to another inode-data file, such as the new inode data file 136 in the new change log 132.

Figure 3:
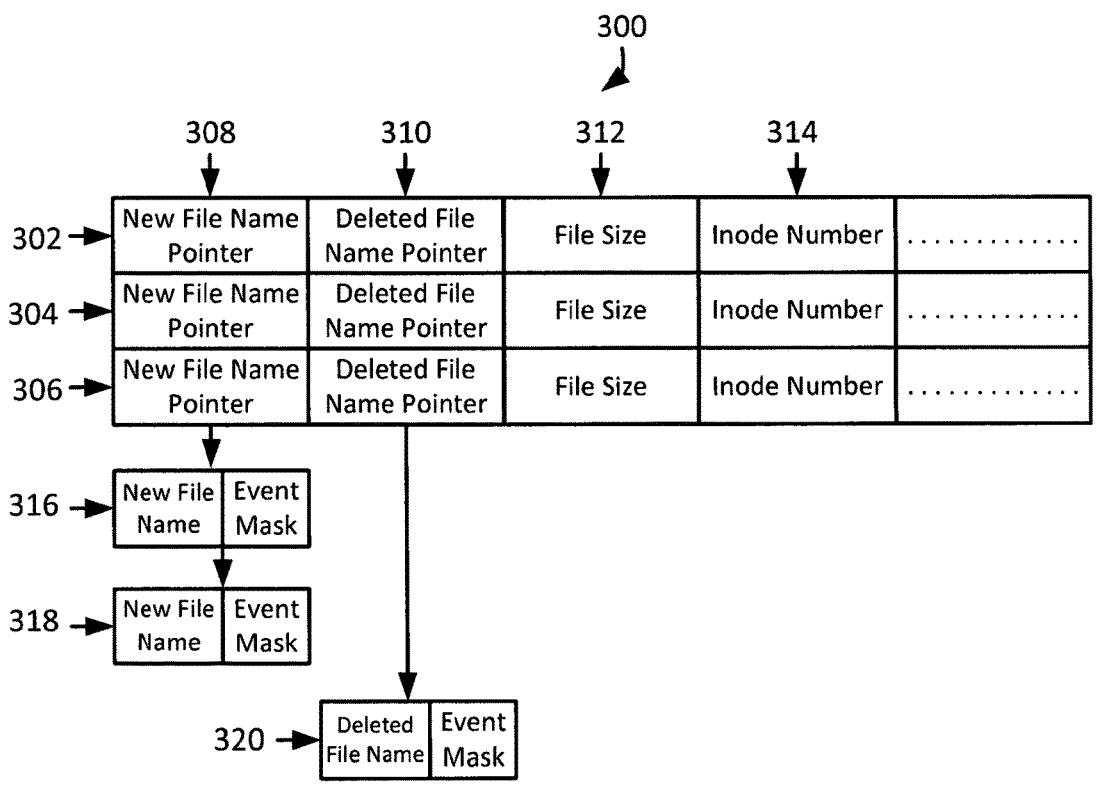
FIG. 3 is an extremely simplified example of a inode data file for incrementally backing up file system hard links based on change logs, under an embodiment.

FIG. 3 illustrates an example of the current inode data file 130 that is included in the current change log 126 used in performing backup operations. The inode-data file 300 includes multiple records, such as records 302, 304, and 306. Since there is a one to one correspondence between the number of records in the inode-data file 300 and the number of inode in a system, the size of the inode-data file 300 is bounded by the number of inode and the inode-data file 300 is not susceptible to becoming too large and does not need to wrap around like a conventional change log. In addition, the inode-data file 300 may be a sparse file, which further conserves on space.

The records 302-306 in the inode-data file 300 includes fields that store, by way of example and not limitation, a new file name pointer 308, a deleted file name pointer 310, a file size 312, a last backup size 314, or the like. When an inode is reused or created for a newly created file, and when a hard link is created or modified for an inode with an existing name for a file, the new file name of the file that corresponds to the inode number is stored in linked list of the new file names, such as 316 and 318, which also includes events masks for each of the new file names. Each event mask denotes a set of operations that were performed against the new file name, and these events may be listed in chronological order. The new file name pointer 308 points to the linked list of the new file names, such as 316 and 318, used for a file. When a file name is deleted, the deleted file name of the file is stored in the linked list of deleted file names, such as 320, which also includes events masks for each of the deleted file names. Each event mask denotes a set of operations that were performed against the deleted file name, and these events may be listed in chronological order. The deleted file name pointer 310 points to the linked list of the deleted file names, such as 320, used for a file. While FIG. 3 depicts the linked list of the new file names as two new file names 316 and 318 and the linked list of deleted file names as one deleted file name 320, the linked list of the new file names may include any number of new file names and the linked list of deleted file names may include any number of deleted file names. Although FIG. 3 depicts the linked list of the new file names 316 and 318 and the linked list of deleted file names 320 as separate linked lists, these linked lists may be combined together into a combined linked file name list which lists new file names at one end of the combined linked file name list and lists deleted file names at the other end of the combined linked file name list. The file size 312 stores the size of the file at the time of the last backup, which can be used to track appending writes to the file. The inode number 314 stores the index node number associated with the file, which can be used to index records in the inode data files 130 and 136 for the file An example of an inode record may be as follows:

Deleted File Name Pointer points to: /mnt1/dir1/file1, Event Mask: DELETE
New File Name Pointer points to: /mnt1/dir3/file4, Event Mask: CREATE|SETATTR
Last Backup Size: 0
Inode Number: 0x454fd An example interpretation of this example inode record is that the file was originally /mnt1/dir1/file1, but has been removed, which reflected in the DELETE recorded in the event mask, Later, the inode (number 0x454fd) was reused for a new file named /mnt1/dir3/file4, which explains the CREATE recorded in the event mask. Subsequently, the owner and permissions of the new file were changed, which explains the SETATTR recorded in the event mask. The last backup size is 0 since no backup exists for the new file relative to the most recent backup.

The inode-data file 300 can also be purged in certain circumstances, such as after a backup operation. Alternatively, the system may switch to a different inode-data file, such as the new inode data file 136 in the new change log 132, once a backup operation is initiated.

Figure 4:
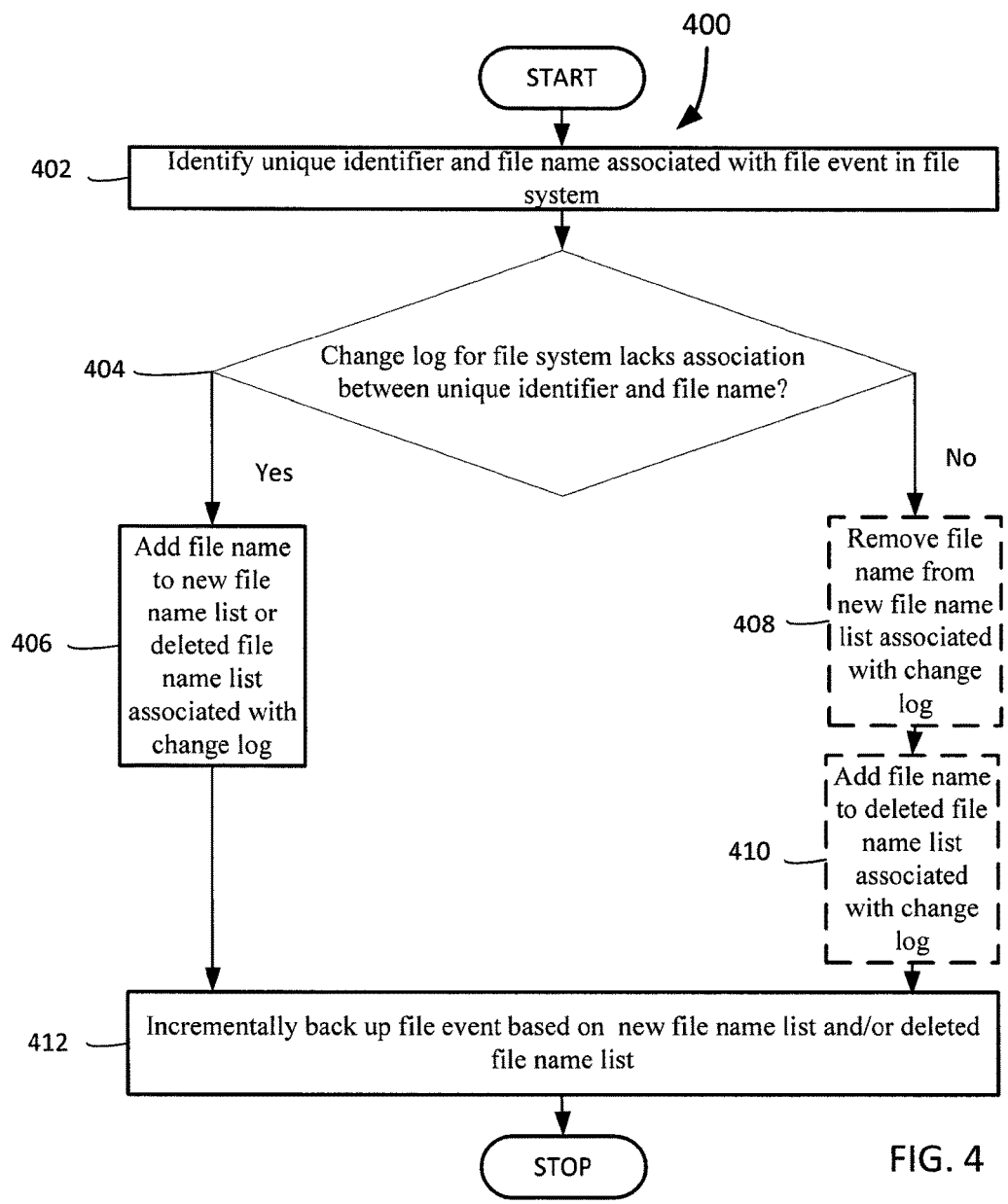
FIG. 4 is a flowchart that illustrates a method for incrementally backing up file system hard links based on change logs, under an embodiment.

FIG. 4 is a flowchart that illustrates a method for incrementally backing up file system hard links based on change logs, under an embodiment. Flowchart 400 illustrates method acts illustrated as flowchart blocks for certain steps involved in and/or between the clients 102-108 and/or the server 110 of FIG. 1.

The backup agent 124 identifies a unique identifier and a file name associated with a file event in a file system, block 402. For example, the backup agent 124 identifies an inode number 701 and a hardlink1 name associated with a file creation in a file system. Having identified a unique identifier and a file name, the backup agent 124 determines whether a change log for the file system lacks an association between the unique identifier and the file name, block 404. For example, the backup agent 124 determines whether the current change log 126 lists the hardlink1 name as a name for the inode number 701. If the change log lacks an association between the unique identifier and the file name, the flowchart 400 continues to block 406. If the change log does not lack an association between the unique identifier and the file name, the flowchart 400 proceeds to block 408.

If the change log lacks the association between the unique identifier and the file name, the backup agent 124 adds the file name to a new file name list or a deleted file name list associated with the change log, block 406. For example, the backup agent 124 adds the hardlink1 name to a new file name list pointed to by the current change log 126 because the current change log 126 does not list the hardlink1 name as a name for the inode number 701. Then the flowchart 400 proceeds to block 412. If the change log does not lack the association between the unique identifier and the file name, the backup agent 124 optionally removes the file name from the new file name list associated with the change log, block 408. For example, the backup agent 124 removes the hardlink1 name from the new file name list pointed to by the current change log 126 because the current change log 126 should no longer list the hardlink1 name as a name for the inode number 701. Having removed the file name from the new file name list, the backup agent 124 optionally adds the file name to the deleted file name list associated with the current change log 126, block 410. For example, the backup agent 124 optionally adds the hardlink1name to the deleted file name list pointed to by the current change log 126.

After modifying the file name lists, the backup agent 124 incrementally backs up the file event based on the new file name list and/or the deleted file name list, block 412. For example, the backup application 120 incrementally backs up the file creation based on the hardlink1 name as a new file name for the inode number 701. The backup agent 124 stores hardlink names of files efficiently for the change logs 126-132 that store file events which are indexed based on the inode numbers of changed files.

Although FIG. 4 depicts the blocks 402-412 occurring in a specific order, the blocks 402-412 may occur in another order. In other implementations, each of the blocks 402-412 may also be executed in combination with other blocks and/or some blocks may be divided into a different set of blocks.

Figure 5:
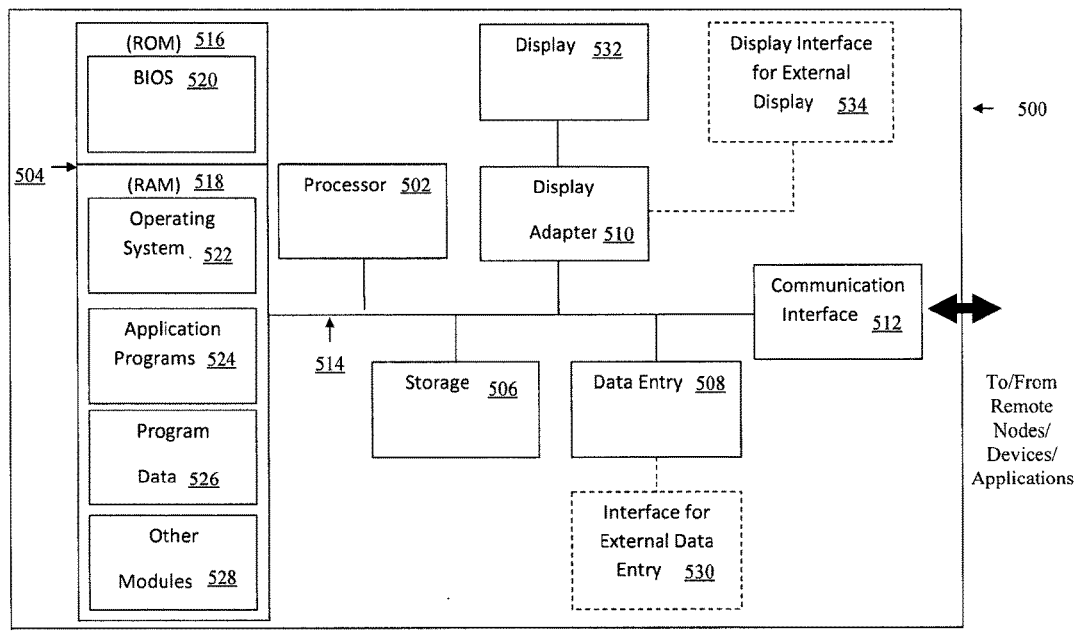
FIG. 5 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, a memory 504, a storage 506, a data entry module 508, a display adapter 510, a communication interface 512, and a bus 514 that couples elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include a read only memory (ROM) 516 and a random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 500. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for incrementally backing up file system hard links based on change logs, the system comprising:
   a processor; and
   a non-transitory computer readable medium storing a plurality of instructions, which when executed, cause the processor to:
   identify, for a file event associated with a file in a file system, a unique identifier and a file name associated with the file, the file event including one of a file creation, a file modification, and a file deletion;
   determine whether a change log for the file system lacks an association between the identified unique identifier and the identified file name, the change log continually recording all file events associated with each file of a plurality files in the file system, all the recorded file events associated with each file being stored in a record in the change log associated with each file, wherein all file events include the file creation, the file modification, and the file deletion;
   add the file name to one of a new file name list having a first file event history and a deleted file name list having a second file event history in response to a determination that the change log for the file system lacks the association between the identified unique identifier and the identified file name, the new file name list and the deleted file name list being referenced by a record in the change log associated with the unique identifier;
   remove the file name from a new file name list associated with the change log in response to a determination that the change log for the file system does not lack the association between the unique identifier and the file name; and
   back up the file event incrementally based on at least one of the new file name list and the deleted file name list.

2. The system of claim 1, wherein the unique identifier is associated with an index node number.

3. The system of claim 1, wherein the change log records file events which occurred since a most recent back up of the file system.

4. The system of claim 1, wherein at least one of the new file name list and the deleted file name list comprises a linked list comprising a plurality of file name entries.

5. The system of claim 1, wherein the plurality of instructions, when executed, will further cause the processor to add the file name to a deleted file name list associated with the change log.

6. A computer-implemented method for incrementally backing up file system hard links based on change logs, the method comprising:
- identifying, for a file event associated with a file in a file system, a unique identifier and a file name associated with the file, the file event including one of a file creation, a file modification, and a file deletion;
- determining whether a change log for the file system lacks an association between the identified unique identifier and the identified file name, the change log continually detecting and recording all file events associated with each file of a plurality files in the file system, all the recorded file events associated with each file being stored in a record in the change log associated with each file, wherein all file events include the file creation, the file modification, and the file deletion;
- adding the file name to one of a new file name list having a first file event history and a deleted file name list having a second file event history in response to a determination that the change log for the file system lacks the association between the identified unique identifier and the identified file name, the new file name list and the deleted file name list being referenced by a record in the change log associated with the unique identifier;
- removing the file name from a new file name list associated with the change log in response to a determination that the change log for the file system does not lack the association between the unique identifier and the file name; and
- backing up the file event incrementally based on at least one of the new file name list and the deleted file name list.

7. The method of claim 6, wherein the unique identifier is associated with an index node number.

8. The method of claim 6, wherein the change log records file events which occurred since a most recent back up of the file system.

9. The method of claim 6, wherein at least one of the new file name list and the deleted file name list comprises a linked list comprising a plurality of file name entries.

10. The method of claim 6, wherein the method further comprises adding the file name to a deleted file name list associated with the change log.

11. A computer program product, comprising a non-transitory computer-readable medium having a computer-readable program code embodied therein to be executed by one or more processors, the program code including instructions to:
- identify, for a file event associated with a file in a file system, a unique identifier and a file name associated with the file, the file event including one of a file creation, a file modification, and a file deletion;
- determine whether a change log for the file system lacks an association between the identified unique identifier and the identified file name, the change log continually recording all file events associated with each file of a plurality files in the file system, all the recorded file events associated with each file being stored in a record in the change log associated with each file, wherein all file events include the file creation, the file modification, and the file deletion;
- add the file name to one of a new file name list having a first file event history and a deleted file name list having a second file event history in response to a determination that the change log for the file system lacks the association between the identified unique identifier and the identified file name, the new file name list and the deleted file name list being referenced by a record in the change log associated with the unique identifier;
- remove the file name from a new file name list associated with the change log in response to a determination that the change log for the file system does not lack the association between the unique identifier and the file name; and
- back up the file event incrementally based on at least one of the new file name list and the deleted file name list.

12. The computer program product of claim 11, wherein the unique identifier is associated with an index node number.

13. The computer program product of claim 11, wherein the change log records file events which occurred since a most recent back up of the file system.

14. The computer program product of claim 11, wherein at least one of the new file name list and the deleted file name list comprises a linked list comprising a plurality of file name entries.

* * * * *